Dec. 11, 1934.　　　J. E. ANDERSON　　　1,983,590
PACKAGE FOR PLASTIC REFRACTORY MATERIAL
Original Filed Aug. 8, 1932
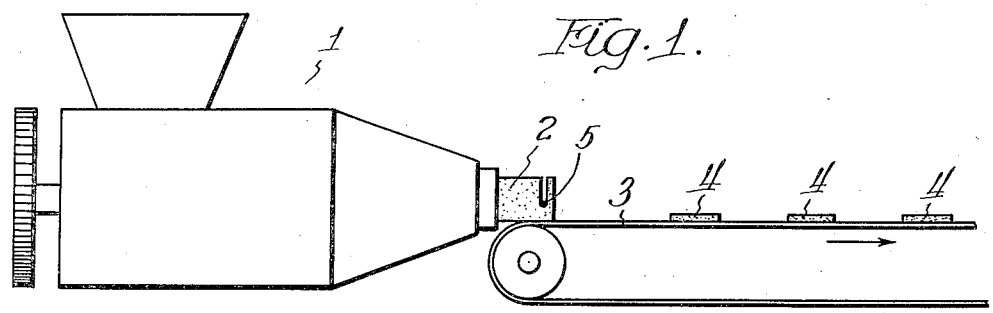
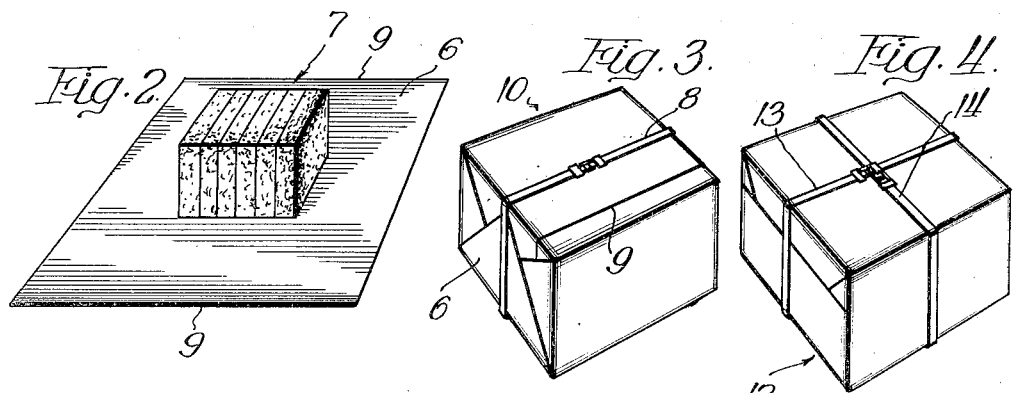
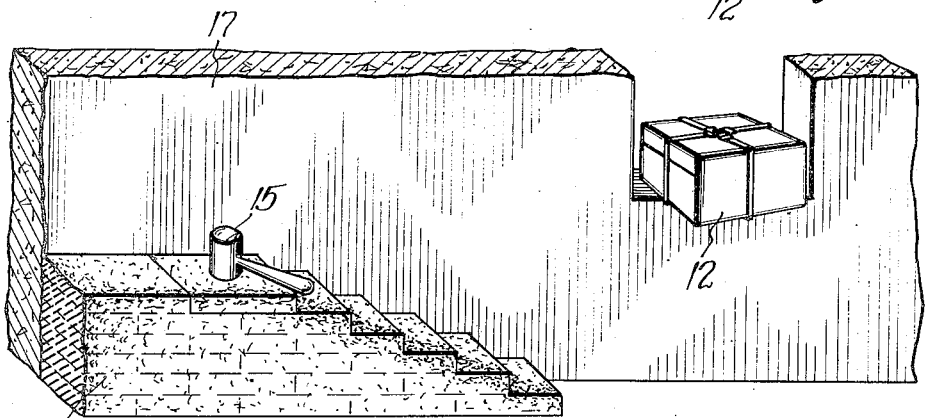
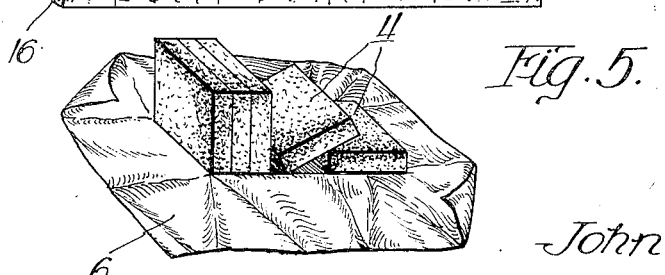
Inventor:
John E. Anderson
By *[signature]*
Attys.

Patented Dec. 11, 1934

1,983,590

UNITED STATES PATENT OFFICE 1,983,590

PACKAGE FOR PLASTIC REFRACTORY MATERIAL

John E. Anderson, Chicago, Ill., assignor to Plibrico Jointless Firebrick Company, Chicago, Ill., a corporation of Illinois Original application August 8, 1932, Serial No. 627,853. Divided and this application November 10, 1933, Serial No. 697,451

5 Claims. (Cl. 206—46)

The present invention relates to the preparation and packaging of plastic refractory material in such manner that its transportation to and application in furnace constructions, fire resisting walls, linings, arches and the like is facilitated, eliminating undue labor cost and excessive handling, as well as increasing the effective application of the material to such constructions.

The subject matter of the present invention is a division of the subject matter disclosed in my co-pending application, Serial No. 627,853, filed August 8, 1932.

Plastic refractory material has come into general use for lining furnaces, arches and the like. As heretofore supplied, this material has been packaged in bulk in a metallic container or drum. The drum is substantially air-tight and moisture-tight, and it tends to maintain the material in a suitable plastic condition for application to the wall or surface to which it is to be applied. If such material is exposed to air, it may dry out to such an extent that it is not suitable for application, and does not produce an effective lining.

The handling of these drums with a relatively large mass of refractory material therein is difficult because of the weight and size of the same, and in order to apply the plastic from the drum to the job, it is necessary that the mass be cut or broken into pieces small enough to be readily handled and applied. The material is of a thickness such as to require tamping to bond the detached pieces together to form a monolithic lining.

In the prior practice, it has been necessary to cut or break the mass from the drums into suitable pieces or chunks, apply these to the wall, and to shape and then tamp them together. The irregular size of the pieces, as broken from the mass, increases the time necessary to fit the pieces properly into the lining, and further, does not produce an effective substantially homogeneous lining without excessive tamping and the like.

I have conceived the desirability of preforming the plastic material into sizes and shapes suitable for direct application to a wall and to each other, and delivering these in suitable condition directly to the user. The advantages gained by this procedure are striking. By forming rectangular slabs of suitable dimensions, for example, 2" by 9" by 12", these slabs can be applied directly to the wall and tamped into bonding engagement successively without the necessity for shaping or cutting the plastic material from a large unwieldy mass. The building of the wall can be performed more expeditiously and efficiently by the use of preformed slabs, the material can be handled to better advantage, and a more uniform application is possible. In order to deliver the slabs to the user at the place of use in proper condition for immediate application, I have conceived the desirability of assembling in a relatively small stack or pile a number of these slabs to form a suitable package that can be conveniently carried by a workman, and can conveniently be passed through a firebox door or the like, and delivered at the spot where the wall or lining is being constructed.

The delivery of these slabs without adverse change in their plasticity or moisture content, and without change or deformation in shape, is accomplished, according to my invention, by immediately sealing the slabs in a substantially air and moisture tight wrapper after the formation thereof, and supporting the same in a rectangular box closely fitting the pile of slabs and conforming to the periphery of the stack. The slabs, because of their relatively large surface area as compared to their volume, are subject to drying on the surfaces, and hence lose some of their bonding characteristics when they are stacked, thus eliminating danger of bonding during stacking. After the moisture retaining wrapper has been placed about them, the moisture content in the central portion of each slab tends to work toward the surface of the slab. Since the wrapper prevents evaporation of moisture from the stack, a condition of equilibrium is reached, with the slabs having a uniform moisture content throughout the stack. Bonding at this time is prevented because there is no manipulation of the slabs and no pressure on them, as they are enclosed within the carton. In this manner, the slabs are brought to the proper condition for application, having a maximum plasticity for a given moisture content. The rectangular containing box which fits the pile of slabs quite closely holds them in shape, and prevents deformation. The pile is made small enough so that the slabs do not bond together by pressure in the package during handling or when allowed to stand for a period of time, which might occur with relatively large stacks or piles, and the package is, at the same time, in the preferred form of the invention, of not excessive weight for a single workman to handle expeditiously. The slabs are preferably so stacked as to support their own weight independently of the other slabs in the stack, to prevent any possibility of bonding due to pressure when a large number of packages are stacked in a warehouse or the like.

The box or outer enveloping member may be a stiff fiber board or similar carton, and the package is relatively inexpensive, the container being destroyed readily as the package is opened, or being retained and used for future packaging.

Heretofore, where the plastic refractory material has been shipped to a desired location in a sheet metal container, such as a drum or the like, extra labor and handling has been required because of the size of the firebox opening, which may be too small to accommodate such a drum. Also, the weight of such a container filled with the plastic is such as to make it inconvenient and undesirable to move the container bodily into the firebox even if the opening is large enough to accommodate it. In such instances, it has been necessary to break the drum open outside of the fire-box, cut the material into suitable slabs or pieces, and pass them to the workmen within the enclosure thru the firebox opening. This consumes considerable time and extra labor, in that the chunks or broken pieces must be fitted, and must be thoroughly tamped in order to provide an effective lining or the like.

According to my invention, the package itself is passed into the firebox or other enclosure, and the preformed slabs are taken from the package and applied directly to the wall with minimum handling and breakage, and with a maximum of convenience and ease in applying the material and tamping the same to bond, as well as providing an effective refractory structure, having the characteristics of a monolithic lining. The wrapper which surrounds the slabs can be spread out within the firebox and so used as a sort of working table, preventing the slabs from coming into contact with dirt, ashes or debris which may be within the firebox.

In order to acquaint those skilled in the art with the manner of practicing my invention, I shall describe, in connection with the accompanying drawing, a specific embodiment of the same.

Figure 1 diagrammatically illustrates the extrusion of a stream of the plastic refractory material after it has been suitably tempered, and also illustrates the cutting of the slabs from the stream;

Figure 2 illustrates the piling together of a number of these slabs in contact with each other, preparatory to wrapping them in a moisture retaining wrapper;

Figure 3 shows the group of slabs, for example, six in number, enclosed within the moisture retaining wrapper;

Figure 4 is a perspective view of the finished package or carton ready for shipment and delivery to the user; and Figure 5 shows the method of application of a slab in forming a wall or lining for the furnace, and also illustrates the manner in which the cartons are handled and utilized in practicing the invention.

Referring now to the drawing in detail, Figure 1 shows an auger mill 1, which is of any suitable type for extruding a stream 2 of the plastic refractory therefrom. This plastic refractory is first kneaded and tempered in a pug mill or other suitable means to form a stiff, substantially homogeneous plastic mass. The stream 2 is squirted out upon a conveyor or belt 3, and is cut off into slabs 4, such cutting operation being illustrated at 5. While I have shown the slabs as being cut off one at a time, as the stream issues from the mill, it is to be understood that by the use of any special wire cutting machine, two or more slabs may be cut at a time. The extrusion and cutting of a stream of plastic is well known, in a general way, and follows the practice in the brick industry to which reference is hereto made. In the operation illustrated the conveyor 3 preferably runs faster than the stream 2 in order to separate the individual slabs.

The slabs 4 are of a suitable thickness to adapt them to be tamped together for bonding purposes, as will be explained later. I have found that a suitable dimension for a material such as is used in making fire brick or refractory lining to be two inches in thickness. I do not intend however, to be limited to this dimension, but mention the same as a suitable dimension to be employed in the practice of the invention. The slabs 4 are substantially rectangular in form, being cut from a rectangular stream 2, and their lateral dimensions are, for example, 9" by 12". These dimensions, obviously, may be varied if desired. The slabs 4 are substantially self-sustaining, being of a plasticity approximately like a green stiff mud brick before drying. These slabs are taken from the conveyor and are set together on edge, as shown in Figure 2, upon a sheet of moisture retaining paper, for example, oiled paper, vegetable parchment, or the like. This prevents any bonding due to pressure, which might occur if they were stacked vertically. The sheet 6 is large enough to fold over and form a substantially moisture and air tight wrapper about the mass or pile 7 of slabs, which are preferably set upon one of their lateral edges, with their faces abutting. As shown in Figure 2, six slabs have thus been piled together or stacked to form a suitable sized package, and they weigh, when of the dimensions above given, approximately 100 pounds. This forms a package which is of a convenient size for handling. It is small enough to be passed through a furnace door or the like, and is not too heavy to be handled expeditiously by individual workmen.

In Figure 3 I have shown the moisture retaining wrapper folded in place in close contact with the pile of slabs 4, and this wrapper is held in folded position by means of a flat metal strap, binder, or band indicated at 8, which is passed around the mass 7 of slabs in such a direction as to hold them together, and also in such a direction as to hold the folded ends of the moisture retaining wrapper 6. The wrapper 6 is applied and folded in such a manner as to bring the joint between the edges 9, 9 of the wrapper 6 transversely of the slabs 4, and lengthwise of the strap or band 8. This brings the folded ends of the wrapper 6 under the band 8, as is clearly shown in Figure 3.

The package thus formed and shown in Figure 3 is then disposed in a rectangular box or carton which may be formed of stiff fiber board, corrugated board, or the like, which may be suitably stapled or otherwise secured in position, to give a support to the package 10 on all sides. Box 12 may be formed of any other material suitable for closely fitting the package 10, and retaining the shape thereof. The box 12 with the package therein is closed, and is retained in closed position by means of two crossed straps or bands of metal 13 and 14, or any other suitable closure means. The package is then shipped to the user.

While in storage and in transit, the retention of the slabs within the moisture proof or moisture retaining wrapper 6 serves a highly useful purpose in permitting a thorough diffusion of moisture throughout the blocks or slabs 4 to give them maximum plasticity without increasing their moisture content. When the package is delivered at the place of forming the wall it is opened. The box or carton is removed, or may be merely torn apart, and the slabs or blocks 4 are retained upon the moisture retaining wrapper 6, which is folded out as shown in Figure 5, at the place where the slabs are to be applied, thereby avoiding excessive handling and avoiding breakage. Also, by unfolding the wrapper 6, a suitable working surface, clear of debris, dirt and the like is formed. The blocks 4 are then laid one at a time and tamped down to bond, as by means of the mallet 15 or any other suitable tamping tool. The slabs are thereby bonded by tamping to form a solid wall 16, which may be a lining for the inside of a furnace wall, such as the wall 17. Obviously, instead of being built into a flat, vertical wall, these slabs may be built into an arch or any other shape desired.

It will be noted, in Figure 5, that I have shown one of the packages opened and the wrapper thereof spread out to form a sort of working table upon which the slabs 4 are positioned. At the same time, a completely closed and banded carton 12 is shown as being passed through the relatively small opening into the firebox. It is apparent that it would be inconvenient to pass the plastic material within a metallic drum or similar container through such an opening, because of its size and relative weight. It would be necessary, in this case, to open the drum and break out the material in the form of chunks or blocks which would then have to be passed through the opening to the workmen within the furnace. By providing the package of the present invention, this extra handling and labor is eliminated, and the workmen can expeditiously handle the package and open it as needed without requiring additional help.

After the wall or furnace lining is formed, it is, of course, subjected to the heat of the furnace, as such heat of the furnace fires and hardens the same. Due to the uniformity of the slabs before they are applied, and the tendency to equalize the plasticity and moisture content thereof while in the package, and due to the fact that they are tamped together in a monolithic structure, the firing of the wall or lining, and the burning or hardening of the same is accomplished with minimum cracking or checking. The slabs form an effective means for applying such a lining to a wall or construction or the like, and facilitate the production of a monolithic homogeneous wall or structure.

I do not intend to limit my invention to the exact type of package shown and described in connection with the disclosure of the present invention, since I am aware that numerous changes and modifications may be made therein without departing from the spirit of the invention, and I therefore intend to be limited only as defined by the appended claims.

I claim:

1. A package for the transportation from the mill to the place of use for the building of a monolithic wall of predetermined thickness, of preformed rectangular plastic refractory slabs which as they come from the mill are of the proper shape and of a size which provides a suitable dimension for controlling the thickness of the wall to be formed, and contain a suitable average moisture content low enough to keep them from bonding by contact but great enough to permit bonding by tamping when properly diffused, and wherein the moisture content is irregularly distributed and insufficiently diffused whereby bonding by tamping is difficult, said package comprising an assembly of a relatively small number of slabs as they come from the mill, and a moisture retaining envelope enclosing said assembly of slabs, and a form retaining box enclosing the assembly and envelope, said box protecting the envelope from injury and holding the assembly in rectangular form, the slabs in said package when delivered to the user having the moisture content thereof thoroughly equalized and diffused to improve the plasticity of the material and to facilitate bonding of the slabs together by tamping into a monolithic wall.

2. A package of plastic refractory which has been tempered and worked in a mill before packaging, said package comprising an assembly of flat rectangular slabs, approximately six in number, of substantially the same size, i. e., approximately 2" x 9" x 12", said dimensions being suitable to control the thickness of the wall to be formed, the moisture content being so low that the slabs will not bond together in the package by mere contact, a moisture retaining wrapper enclosing said assembly of slabs, and a readily destructible form retaining rectangular box enclosing the assembly and wrapper, said refractory, when delivered to the user, having the moisture content of the slabs thoroughly equalized and diffused to improve the plasticity of the material and to facilitate bonding of the slabs together by tamping when the package is opened.

3. The method of producing plastic refractory suitable for tamping into a monolithic wall which comprises tempering the raw refractory material to provide a suitable average moisture content which is too low for bonding by contact, milling and extruding the plastic in a rectangular stream, cutting the stream into slabs, said slabs being of a size providing a dimension suitable for controlling the thickness of the wall to be formed having on the average a suitable moisture content but individually varying as to moisture content and said moisture being imperfectly diffused in the individual slabs, assembling a plurality of the slabs in the aforesaid condition and confining the assembled slabs in a moistureproof wrapper in moisture interchanging relation to each other, the slabs within said wrapper having their moisture contents equalized and the moisture being thoroughly diffused throughout said slabs to give them improved plasticity.

4. The method of producing plastic refractory suitable for tamping into a monolithic wall, which comprises tempering the raw refractory material to provide a suitable average moisture content which is too low for bonding by contact, milling and extruding the plastic in a rectangular stream, cutting the stream into slabs, said slabs being of a size providing a dimension suitable for controlling the thickness of the wall to be formed having on the average a suitable moisture content but individually varying as to moisture content and said moisture being imperfectly diffused in the individual slabs, assembling a plurality of the slabs in the aforesaid condition and confining the assembled slabs in a moistureproof wrapper in moisture interchanging relation to each other, the slabs within said wrapper having their moisture contents equalized and the moisture being thoroughly diffused throughout said slabs to give them improved plasticity, and transporting said slabs in said confinement, and without bonding, to the place of use.

5. The method of preparing plastic refractory for use in building a monolithic wall, which comprises tempering the clay to provide it with the proper percentage of moisture, forming the clay into slabs of the desired dimensions, one of said dimensions being suitable for controlling the thickness of the wall to be formed, then assembling a plurality of the slabs substantially in the condition as to moisture content and plasticity in which they come from the forming operations, and then confining the assembled slabs in a moisture retaining wrapper in such relation to each other that the moisture content is substantially equalized between slabs, and the moisture of each slab is thoroughly diffused throughout its body to give it maximum plasticity.

JOHN E. ANDERSON.